(12) United States Patent  
Van Steenberge et al.

(10) Patent No.: US 8,567,257 B2
(45) Date of Patent: Oct. 29, 2013

(54) OPTICAL TACTILE SENSORS

(75) Inventors: Geert Van Steenberge, Sint-Amandsberg (BE); Erwin Bosman, Ghent (BE); Hugo Thienpont, Gooik (BE)

(73) Assignees: IMEC, Leuven (BE); Vrije Universiteit Brussel, Brussels (BE); Universiteit Gent, Ghent (BE)

( * ) Notice: Subject to any disclaimer, the term of this patent is extended or adjusted under 35 U.S.C. 154(b) by 0 days.

(21) Appl. No.: 13/329,568

(22) Filed: Dec. 19, 2011

(65) Prior Publication Data

US 2012/0160031 A1  Jun. 28, 2012

Related U.S. Application Data

(63) Continuation of application No. PCT/EP2010/058808, filed on Jun. 22, 2010.

(60) Provisional application No. 61/219,698, filed on Jun. 23, 2009.

(51) Int. Cl.
*G01L 1/24* (2006.01)

(52) U.S. Cl.
USPC .......................................................... 73/800

(58) Field of Classification Search
USPC .......................................................... 73/800
See application file for complete search history.

(56) References Cited

U.S. PATENT DOCUMENTS

| | | | | |
|---|---|---|---|---|
| 5,331,658 A * | 7/1994 | Shieh et al. | .............. | 372/50.124 |
| 5,619,318 A * | 4/1997 | Yamamoto et al. | .............. | 356/32 |
| 6,567,572 B2 * | 5/2003 | Degertekin et al. | .............. | 385/12 |
| 6,785,317 B2 * | 8/2004 | Panajotov et al. | .............. | 372/96 |
| 6,836,578 B2 * | 12/2004 | Kochergin et al. | .............. | 385/12 |
| 6,845,118 B1 * | 1/2005 | Scott | .............. | 372/96 |
| 7,283,214 B2 * | 10/2007 | Xu et al. | .............. | 356/5.15 |
| 7,355,720 B1 * | 4/2008 | Carr | .............. | 356/498 |
| 7,529,448 B2 * | 5/2009 | Chen et al. | .............. | 385/50 |
| 7,742,515 B2 * | 6/2010 | Guenter | .............. | 372/50.124 |
| 8,313,962 B2 * | 11/2012 | Lott et al. | .............. | 438/26 |

(Continued)

FOREIGN PATENT DOCUMENTS

DE  10024982 A1  11/2001
EP  0665425 A2  8/1995

(Continued)

OTHER PUBLICATIONS

Yamamoto et al, "Optical Tactile Sensor Using Surface Emitting Laser", Olympus Optical Co. Ltd, 1995 IEEE, see whole document.*

(Continued)

*Primary Examiner* — Lisa Caputo
*Assistant Examiner* — Octavia Davis-Hollington
(74) *Attorney, Agent, or Firm* — Knobbe Martens Olson & Bear LLP

(57) ABSTRACT

A sensor for sensing pressure is disclosed. The sensor may be a pressure sensor for sensing pressure, or a tactile sensor for sensing tactile events through pressure measurement. In one aspect, the sensor includes at least one pressure sensor having at least one VCSEL on a substrate. It further includes a compressible sensor layer covering a top surface of the at least one VCSEL, and a reflecting element covering a top surface of the sensor layer. A method of manufacturing such a sensor is also disclosed.

24 Claims, 9 Drawing Sheets

(56) References Cited

U.S. PATENT DOCUMENTS

| | | |
|---|---|---|
| 2006/0181712 A1 | 8/2006 | Degertekin et al. |
| 2007/0280581 A1 | 12/2007 | Wipiejewski |
| 2009/0074017 A1* | 3/2009 | Choi .............................. 372/24 |
| 2009/0151423 A1 | 6/2009 | Wu et al. |

FOREIGN PATENT DOCUMENTS

| | | |
|---|---|---|
| JP | 2006145756 | 8/2006 |
| WO | WO 02/37411 A1 | 5/2002 |
| WO | WO 2008/135903 A2 | 11/2008 |

OTHER PUBLICATIONS

Halbritter et al., "Impact of Micromechanics on the Linewidth and Chirp Performance of MEMS-VCSELs", IEEE Journal of Selected Topics in Quantum Electronics, vol. 13, No. 2, Mar./Apr. 2007, pp. 367-373.

Bosman et al., "Fully embedded optical and electrical interconnections in flexible foils", 2009 European Microelectronics and Packaging Conference (EMPC), Jun. 15, 2009, IEEE Piscataway, NJ, USA.

Minoni, "Absolute Interferometric Measurement of Differential Displacements", IMTC 2006—Instrumentation and Measurement Technology Conference Sorrento, Italy Apr. 24-27, 2006, pp. 2359-2363.

M. Wang, "Fourier transform method for self-mixing interference signal analysis", Optical & Laser Technology, vol. 33, No. 6, pp. 409-416, 2001, pp. 409-416.

International Search Report for International Application No. PCT/EP2010/058808 mailed Oct. 18, 2010 by European Patent Office.

* cited by examiner

OPTICAL TACTILE SENSORS

CROSS REFERENCE TO RELATED APPLICATIONS

This application is a continuation of PCT Application No. PCT/EP2010/058808, filed Jun. 22, 2010, which claims priority under 35 U.S.C. §119(e) to U.S. provisional patent application 61/219,698 filed on Jun. 23, 2009. Each of the above applications is incorporated herein by reference in its entirety.

BACKGROUND OF THE INVENTION

1. Field of the Invention

The disclosed technology relates to optical sensors, more in particular to optical tactile sensors integrated in a flexible and/or stretchable foil.

2. Description of the Related Technology

Multiple research centers are developing miniaturized sensor elements that can be distributed over an area to measure physical properties such as pressure, temperature or the proximity of objects. Such miniaturized sensor elements can be fabricated based on microelectromechanical systems (MEMS) technology. Most MEMS devices are built on rigid substrates such as silicon wafers or glass wafers. However, it can be advantageous to provide such sensors on flexible substrates, because this may allow mounting the sensors on non-planar surfaces or even on flexible objects such as a human body. A possible way for providing sensors on flexible substrates comprises flip-chip mounting of a rigid substrate comprising sensors onto a flexible carrier and subsequently selectively etching the rigid substrate for forming distinct rigid islands. A disadvantage of this approach is that it relies on standard IC fabrication technologies, such that it is difficult to create large area sensors at low cost.

Elastomer tactile sensitive foils have been developed based on piezo-resistive, piezoelectric and capacitive force sensing technologies. However, most of these structures suffer from various limitations such as low spatial resolution, small resolution or expensive manufacturing processes.

To circumvent limitations related to electrical connectivity, replacement of electrical sensors by optical sensors clearly offers a solution. Optical technologies have the additional advantage that they are insensitive to electromagnetic interference and that they can be used in harsh environments.

The most common tactile sensors available today are static and passive. They can be used to provide only a static perception of an object shape. Less common are dynamic and active sensors. Such sensors can be used in conjunction with relative motion between a sensor and a contact body to provide a dynamic perception of high frequency elements such as e.g. a surface texture.

In U.S. Pat. No. 7,355,720 a dynamic and active optical displacement sensor is described that can e.g. be used as a vibration sensor or as a pressure sensor. The sensor utilizes optical feedback into a vertical-cavity surface-emitting laser (VCSEL) from an external optical cavity formed by a moveable membrane and an output mirror of the VCSEL. This results in the optical cavity of the VCSEL being coupled to the external optical cavity. As a result, any movement of the membrane in response to sound, vibration, acceleration, pressure, etc. produces a change in the lasing characteristics of the VCSEL, and in particular a change in the intensity of a beam of lasing light produced by the VCSEL (self-mixing interference). This change in intensity is sensed by a photodetector. The fabrication process for the sensors described in U.S. Pat. No. 7,355,720 is relatively complex. The sensors comprise a membrane that is suspended on a rigid substrate. The VCSEL is mounted on another (rigid) substrate that is to be bonded to the substrate comprising the membrane. A good alignment between the photodetector and the VCSEL is needed. The need for suspending the membrane requires a rigid structure (e.g. substrate, spacer) surrounding the sensing element. When forming a sensor array, such rigid structure may limit the sensor density and thus the spatial resolution that can be realized.

SUMMARY OF CERTAIN INVENTIVE ASPECTS

Certain inventive aspects relate to methods and systems for pressure sensing or tactile event sensing as well as good methods for manufacturing such sensors. It is an advantage of certain aspects that systems and methods are provided allowing accurate pressure sensing. It is an advantage of certain aspects that systems and methods are provided allowing accurate tactile sensing at high spatial resolution.

Certain inventive aspects relate to an optical pressure sensor and an optical tactile sensor based on self-mixing interference (SMI) in a VCSEL wherein the optical tactile sensor has a higher spatial resolution as compared to prior art SMI-based sensors.

One aspect relates to a sensor comprising at least one VCSEL on a substrate, a compressible sensor layer covering a top surface of the at least one VCSEL and a reflecting element covering a top surface of the sensor layer. One aspect relates to a sensor comprising at least one VCSEL on a substrate, wherein a top surface of the VCSEL is covered with a compressible sensor layer, a top surface of the sensor layer being covered with a reflecting element such as a reflector or a mirror. The active detection mechanism is based on SMI measurements wherein displacements of the reflecting element at the top surface of the sensor layer resulting from e.g. an external pressure on that surface are measured, preferably by measuring an electrical parameter of the VCSEL. These displacements are translated to a pressure, through the mechanical characteristics of the sensor layer material, such as the Young's modulus, Bulk modulus, Poisson coefficient and/or density.

In some embodiments the VCSEL may be embedded in the compressible sensor layer or in a solid and/or liquid encapsulation material in direct contact with the compressible sensor layer.

In one aspect, a sensor allows realizing sensor arrays with a higher sensor density and thus a higher spatial resolution as compared to prior art sensors, e.g. SMI based sensors In one aspect, the sensor density may be determined by the pitch of the VCSELs integrated on a single chip. This VCSEL pitch may be smaller than about 250 micrometer, particularly smaller than about 200 micrometer, smaller than about 150 micrometer, and smaller than about 125 micrometer.

It is an advantage of an optical pressure sensor and an optical tactile sensor according to one inventive aspect that the pressure range and the sensitivity of the sensors can be tuned by a proper selection of the sensor layer material, e.g. by proper selection of the Young's modulus, the Bulk Modulus, Poisson coefficient and/or density of the sensor layer material.

It is an advantage of an optical pressure sensor and an optical tactile sensor according to one inventive aspect that it can be formed on a flexible or stretchable substrate. When providing thin VCSELs on a flexible substrate or on a stretchable substrate and by selecting a flexible or stretchable sensor layer, flexible or stretchable sensors can be fabricated. This allows using such flexible or stretchable optical tactile sensors as foils over irregular or non-planar surfaces, for example in distributed sensing applications. It also allows using such sensors on moveable surfaces, e.g. for gait and posture analysis, prosthetic analysis, breast cancer detection, prevention of bedsores, minimally invasive surgery, service robots, control of walking robots or intelligent clothing.

It is an advantage of optical pressure sensors and optical tactile sensors according to one inventive aspect, that they can be fabricated with a fabrication process that is less complex and cheaper as compared to prior art processes.

One inventive aspect relates to an optical sensor comprising at least one VCSEL coupled to an external optical cavity formed by an output mirror of the at least one VCSEL and a movable reflecting element, wherein the external optical cavity comprises a compressible sensor layer covering the at least one VCSEL. In operation, an optical sensor according to one inventive aspect measures displacements of the movable reflecting element based on self mixing interference in the at least one VCSEL. In preferred embodiments, in operation, a fixed voltage higher than the laser threshold voltage is applied to the VCSEL and the VCSEL current is measured.

In one aspect, the movable reflecting element can comprise a reflector, e.g. a metal reflector, provided at the top surface of the sensor layer. The at least one VCSEL may be provided on a substrate and encapsulated in an encapsulation layer. The substrate may be a rigid substrate, a flexible substrate or a stretchable substrate. The thickness of the VCSEL may for example be in the range between about 10 micrometer and 100 micrometer, particularly in the range between about 10 micrometer and 60 micrometer, or between about 10 micrometer and 25 micrometer. An optical sensor according to one aspect can be a flexible sensor or a stretchable sensor.

An optical sensor according to one inventive aspect can comprise a plurality of VCSELs, e.g. a plurality of VCSELs arranged in an array, thereby forming an optical tactile sensor. The spatial resolution of an optical tactile sensor according to one aspect can be smaller than about 250 micrometer, smaller than about 150 micrometer, or smaller than about 125 micrometer.

In one aspect, an optical sensor can advantageously be used as a pressure sensor or as a tactile sensor. In one aspect the mechanical properties of the sensor layer material such as the Young's modulus, the Bulk modulus, the Poisson coefficient and/or the density can be selected for tuning the sensitivity and the measurement range of the sensor.

Certain inventive aspects relate to a method for manufacturing an optical sensor, the method comprising providing at least one VCSEL on a substrate, providing a compressible sensor layer covering the VCSEL on the substrate and providing a reflecting element covering the compressible sensor layer. Providing a compressible sensor layer covering the VCSEL on the substrate may comprise depositing the compressible sensor layer on top of the VCSEL or a layer embedding the VCSEL.

Providing at least one VCSEL on a substrate may comprise providing an encapsulation layer on the substrate, creating a cavity in the encapsulation layer suitable for accommodating the VCSEL, embedding the VCSEL and further encapsulating the VCSEL by providing a further encapsulation layer. Providing at least one VCSEL on a substrate may comprise providing a plurality of VCSELS. A pitch between the plurality of VCSELS may be smaller than about 250 μm.

Particular and preferred aspects of the invention are set out in the accompanying independent and dependent claims. Features from the dependent claims may be combined with features of the independent claims and with features of other dependent claims as appropriate and not merely as explicitly set out in the claims.

Certain embodiments of the invention will now further be discussed in the detailed description in conjunction with the drawings. The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

One aspect relates to a method for sensing pressure, the method comprising driving a VCSEL for generating a laser beam, guiding the laser beam through a compressible sensor layer, reflecting the laser beam thus redirecting the laser beam to the VCSEL and deriving a pressure on the compressible sensor layer based on a self-mixing interference effect in the VCSEL. Deriving a pressure may be based on measurement of an electrical characteristic of the VCSEL responsive to the self-mixing interference effect.

DETAILED DESCRIPTION OF CERTAIN ILLUSTRATIVE EMBODIMENTS

Figure 1:
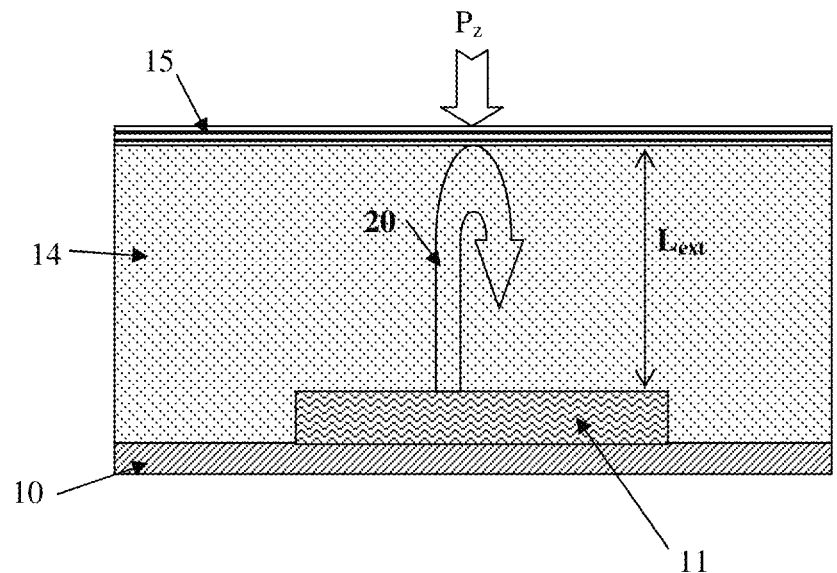
FIG. 1 schematically shows the structure of an optical sensor according to one embodiment.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present description, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those in the art. For example, any of the embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present description the term pressure sensor is used for indicating a sensor comprising a single sensing element, i.e. a sensor comprising a single VCSEL. The term tactile sensor is used for indicating an array of pressure sensors. A tactile sensor thus comprises a plurality of sensing elements, each sensing element comprising a single VCSEL.

Certain embodiments relate to an optical pressure sensor and an optical tactile sensor based on self-mixing interference (SMI) in a VCSEL wherein the optical tactile sensor has a higher spatial resolution as compared to prior art SMI-based sensors. An optical sensor according to one embodiment comprises at least one VCSEL on a substrate, wherein a top surface of the VCSEL is covered with a compressible sensor layer and wherein a top surface of the sensor layer is covered with a reflecting element such as a reflector or a mirror. The active detection mechanism is based on SMI measurements wherein displacements of the reflecting element at the top surface of the sensor layer resulting from e.g. an external pressure on that surface are measured. These displacements are translated to a pressure, through the mechanical characteristics of the sensor layer material, such as the Young's modulus, Bulk modulus, Poisson coefficient and/or density. The pressure range and the sensitivity of the sensor can be tuned by proper choice of the sensor layer material.

In the context of the present description, the top surface of a VCSEL is the surface of the VCSEL at the front side of the VCSEL, i.e. at the side where light is emitted. The rear side of the VCSEL is the side of the VCSEL opposite to the front side. In an optical sensor according to one embodiment the at least one VCSEL is oriented with its rear side towards the substrate. In the context of the present description the top surface of the sensor layer is the surface of the sensor layer oriented away from the VCSEL.

A sensor according to one embodiment allows realizing sensor arrays with a higher sensor density and thus a higher spatial resolution as compared to prior art solutions In one embodiment the sensor density is determined by the pitch of the VCSELs integrated on a single chip. This VCSEL pitch may, for example, be smaller than about 250 micrometer, smaller than about 200 micrometer, smaller than about 150 micrometer, smaller than about 125 micrometer. For prior art solutions a pitch in the order of 1 mm to 6 mm between sensing elements is reported (U.S. Pat. No. 7,355,720, which is incorporated herein by reference in its entirety).

An optical pressure sensor and an optical tactile sensor according to one embodiment can be formed on a flexible substrate or on a stretchable substrate. When providing thin VCSELs on a flexible or stretchable substrate and by selecting a flexible or stretchable sensor layer, flexible or stretchable sensors can be fabricated. This allows using such flexible or stretchable optical tactile sensors as foils over irregular or non-planar surfaces, for example in distributed sensing applications. It also allows using such sensors on moveable surfaces, e.g. for gait and posture analysis, prosthetic analysis, breast cancer detection, prevention of bedsores, minimally invasive surgery, service robots, control of walking robots or intelligent clothing.

Optical pressure sensors and optical tactile sensors according to one embodiment can be fabricated with a fabrication process that is less complex and cheaper as compared to prior art processes.

The invention will now be described by a detailed description of several embodiments of the invention. It is clear that other embodiments of the invention can be configured according to the knowledge of persons skilled in the art without departing from the true spirit or technical teaching of the invention, the invention being not limited thereto.

In the further description, a sensor and a sensor array are described based on self-mixing interference in a VCSEL, wherein the sensor is used as a pressure sensor, i.e. wherein movement of a reflecting element at the sensor surface resulting from an external pressure on that surface is measured, and wherein from this measurement the external pressure is calculated. However, a sensor and a sensor array according to the one embodiment can also be used for measuring movement of the reflecting element caused by e.g. sound, vibrations, or accelerations. Thus, a sensor and a sensor array according to one embodiment can also be used as e.g. a sound sensor, a vibrations sensor or an acceleration sensor.

In the further description an optical pressure sensor is described wherein the VCSEL is embedded in an encapsulation layer and integrated with a sensor layer. However, other configurations may be used, such as for example a configuration wherein the sensor layer and the reflector are provided on a first facet at one end of an optical fiber and wherein the VCSEL is provided on a second facet at an opposite end of the same optical fiber. In such a configuration the interferometric signal can be detected electrically. In other embodiments the optical pressure sensor (including the VCSEL) can be provided on a facet at one end of an optical fiber and the optical power of the VCSEL can be detected at an opposite end of the optical fiber.

In a first aspect, certain embodiments relate to an optical sensor for sensing pressure. Such an optical sensor may be for sensing pressure or for sensing tactile events through pressure sensing. The optical sensor comprises at least one pressure sensor comprising at least one vertical cavity surface emitting laser VCSEL, typically deposited on a substrate. The sensor furthermore comprises a compressible sensor layer covering a top surface of the at least one VCSEL and a reflecting element covering a top surface of the sensor layer. Several embodiments are possible. In some advantageous embodiments, the VCSEL is embedded in the compressible sensor layer or in a solid and/or liquid encapsulation material in direct contact with the compressible sensor layer. The latter provides an optical path through solid and/or liquid material, resulting in an accurate sensor. Features and advantages of systems according to one embodiment are further discussed with reference to certain embodiments below.

FIG. 1 schematically shows the structure of an optical pressure sensor according to one embodiment. The optical sensor is formed on a substrate 10, e.g. a rigid substrate or a flexible substrate or a stretchable substrate. It comprises a VCSEL 11 emitting light 20 of wavelength $\lambda$ (e.g., about 850 nm), the VCSEL 11 being positioned on the substrate 10 and being embedded in a sensor layer 14 comprising a sensor layer material. The sensor layer 14 is compressible, it is optically transparent (transparency higher than about 1%, particularly higher than about 10%, more particularly higher than about 50%) at the wavelength of the VCSEL, and may be flexible and/or stretchable. At a top surface of the sensor layer 14, a mirror or reflector 15 is provided for reflection of a substantial part of the light 20 emitted by the VCSEL 11.

The operation of an optical sensor according to one embodiment is based on the self-mixing interference effect which is observed when a fraction of light 20 emitted from a laser (e.g. VCSEL 11) is injected back into the laser cavity by reflection from an external object or target (e.g. reflector 15). Due to the coherence of the emitted light, the reflected light is superimposed in a deterministic way with the light inside the laser cavity, depending on the phase shift introduced by the round trip travel to and from the target, which in turn depends on the external cavity length $L_{ext}$, the external cavity length $L_{ext}$ being defined as the distance between an output mirror of the VCSEL 11 and the reflector 15 (see FIG. 1). For example, the VCSEL can be driven by providing a fixed voltage over the VCSEL, wherein the fixed voltage is higher than the laser threshold voltage. Displacement of the external reflector then gives rise to a periodic variation of wavelength, optical power and electrical current, all with a period $\lambda/2$ wherein $\lambda$ is the wavelength of the VCSEL, typically in the order of about 850 nm. One period of this signal corresponds to a displacement equal to $\lambda/2$. This means that the displacement of an object (e.g. reflector 15) can be calculated by counting the number of peaks between the initial and the final position of the object. A continuous monitoring of VCSEL wavelength, optical power or electrical current allows determining the position of the reflector 15. The detection limit and the resolution of the measurements can be substantially increased by using appropriate signal processing techniques. Different appropriate signal processing techniques are reported in the literature. For example, in "Fourier transform method for self-mixing interference signal analysis", Optical Laser Technology, Vol. 33, No. 6, pp. 409-416 (2001), M. Wang, which is incorporated herein by reference in its entirety, reports a signal processing method that allows obtaining a resolution of $\lambda/50$. For a VCSEL with a wavelength of about 850 nm this would result in a resolution of about 17 nm.

In one embodiment, wherein a VCSEL 11 is embedded in or covered with a compressible sensor layer 14, when an external pressure is applied on the top surface of the sensor layer 14 coated with a mirror or reflector 15, the sensor layer thickness and thus the external cavity length $L_{ext}$ changes, resulting in a periodic variation of the VCSEL wavelength, optical power and electrical current. By selecting a sensor layer 14 comprising an appropriate sensor layer material, i.e. a sensor layer material that is compressible and that has appropriate mechanical properties (such as the Young's modulus, Bulk modulus, Poisson coefficient and/or density), and having an appropriate thickness, the change in external cavity length (and thus the displacement of the top surface of the sensor layer 14) can be related to the external pressure applied to that top surface.

In one embodiment, monitoring of an electrical parameter of the VCSEL is used for reading the interferometric signal. For example, the electrical current through the VCSEL can be monitored for a fixed voltage across the VCSEL, wherein the fixed voltage is higher than the laser threshold voltage. An advantage of electrical read-out as compared to optical read-out is that for example the need for a photodetector (e.g. for monitoring the optical power of the VCSEL) can be avoided, at the same time avoiding the need for good alignment between a photodetector and the VCSEL. Avoiding the use of a photodetector simplifies the construction of the optical sensor and the fabrication process and reduces the cost.

Figure 2:
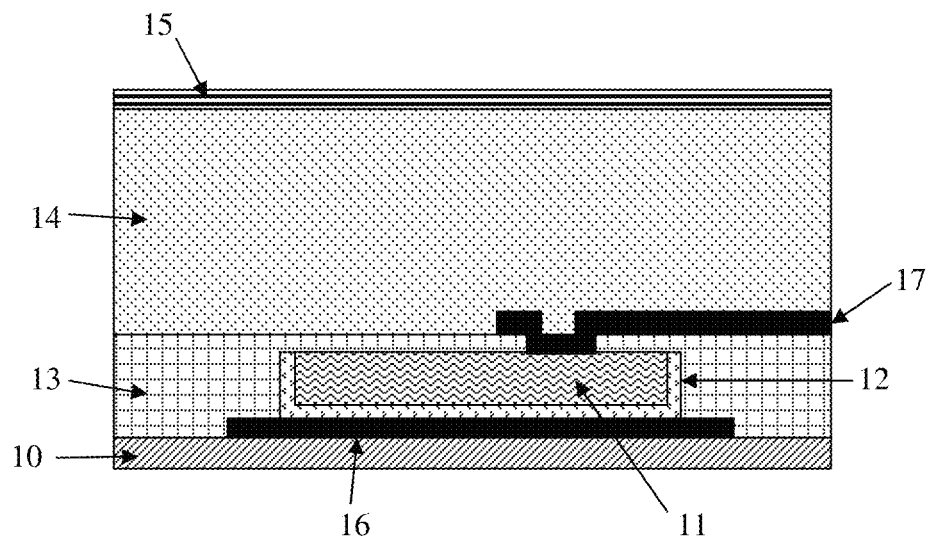
FIG. 2 schematically illustrates the structure of an optical sensor according to one embodiment.

FIG. 2 schematically illustrates the structure of an optical sensor according to one embodiment. FIG. 3a to FIG. 3h shows an example of a process that may be used for fabricating the optical sensor shown in FIG. 2.

In the structure shown in FIG. 2, a patterned metal layer 16 is provided on the substrate 10 and the VCSEL is provided on top of this metal layer, and attached for example by means of a glue 12. The patterned metal layer 16 acts as a heat sink for the VCSEL 11 and functions as an etch stop layer in a fabrication process (as further described in relation with FIG. 3a to FIG. 3h). The VSCEL 11 is embedded in an embedding layer or encapsulation layer 13, and metal contacts 17 to the VCSEL are provided. The sensor furthermore comprises a sensor layer 14, the thickness of which determines the length $L_{ext}$ of the external optical cavity. In one embodiment the embedding layer or encapsulation layer 13 and the sensor layer 14 can be made of a same material or they can comprise a different material. A minor or external reflector 15 is provided on the top surface of the sensor layer 14.

An exemplary method for fabricating the sensor of FIG. 2 is shown in FIG. 3. In a first step, illustrated in FIG. 3a, a patterned metal layer 16 is provided on a substrate 10. The substrate 10 can for example be a rigid substrate such as a FR-4 substrate or a glass substrate or it can be a flexible substrate such as a polyimide or PEN (PolyEthylene Naphtalate) or PET (PolyEthylene Terephtalate) substrate or a stretchable substrate such as a silicone or a PU (PolyUrethane) substrate. The patterned metal layer or metal island 16 can for example be formed by sputtering and photolithographic patterning of a metal layer such as a Cu layer. The metal island 16 functions as a heat sink for the VCSEL 11 when the sensor is in operation and it is also used as an etch stop layer during the further fabrication process. The size of the metal island 16 in a plane parallel to the substrate is at least equal to the size of the VCSEL chip to be embedded in a later stage of the fabrication process.

When using a flexible or a stretchable substrate, the substrate may be attached to a rigid carrier or temporary rigid substrate during processing. For example, a flexible substrate may be attached to a rigid carrier by providing an adhesion promoter only at the edges of the rigid carrier. Sensors may be fabricated in an area inside (surrounded by) the edges where an adhesion promoter is present. After processing the devices may be cut out, thereby releasing them from the rigid carrier. For example, a flexible or stretchable substrate may be attached to a rigid carrier with an appropriate adhesion promoter, such that after processing of the sensors, the flexible and/or stretchable substrate can be peeled off.

Figure 3A:
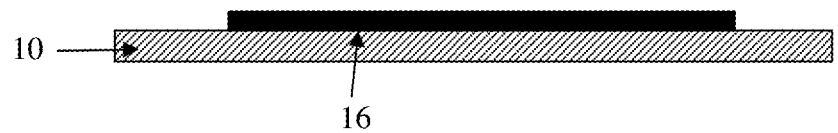
FIG. 3a to FIG. 3h shows an example of a process that may be used for fabricating the optical sensor shown in FIG. 2.
Figure 3B:
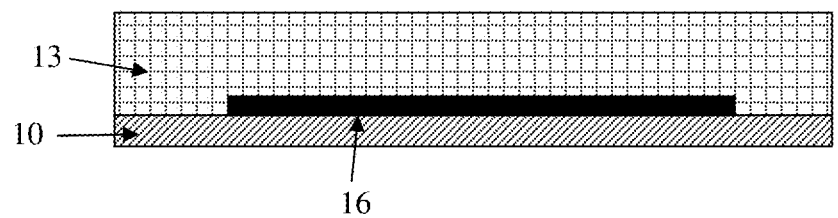
Figure 3C:
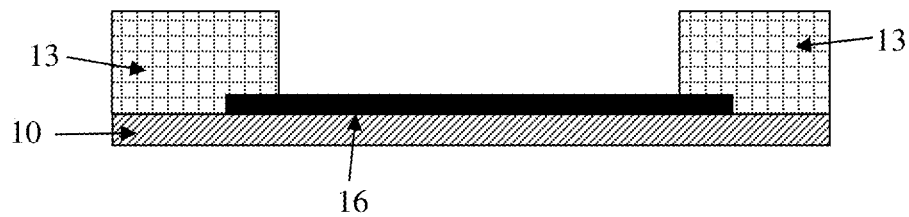

In a next step, shown in FIG. 3b, an encapsulation layer 13, e.g., an SU-8 encapsulation layer, is provided on the substrate comprising the metal island 16. The thickness of the encapsulation layer is preferably substantially the same as the thickness of the VCSEL chip to be embedded. The thickness of the encapsulation layer 13 can for example be in the range between about 10 micrometer and 200 micrometer, or in the range between about 10 micrometer and 100 micrometer.

Next (FIG. 3c), an opening or cavity is made through the encapsulation layer 13, for example by laser ablation with an excimer laser. The cavity is formed in an area on top of the metal island 16. The size of this cavity in a plane parallel to the substrate is typically a few tens of micrometer larger than the size of the VCSEL chip to be embedded in a next step of the fabrication process. In the laser ablation step for forming the cavity, the copper island 16 can advantageously be used as an etch stop layer.

Figure 3D:
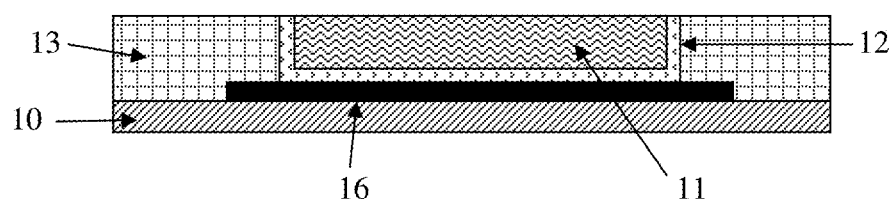
Figure 3E:
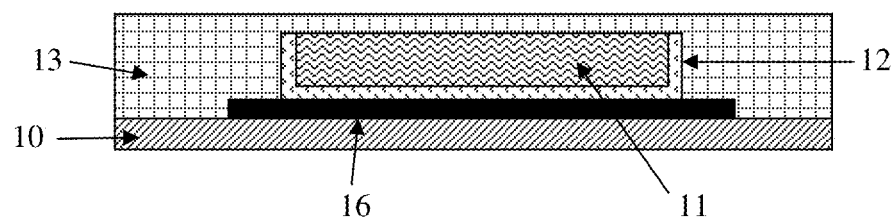
Figure 3F:
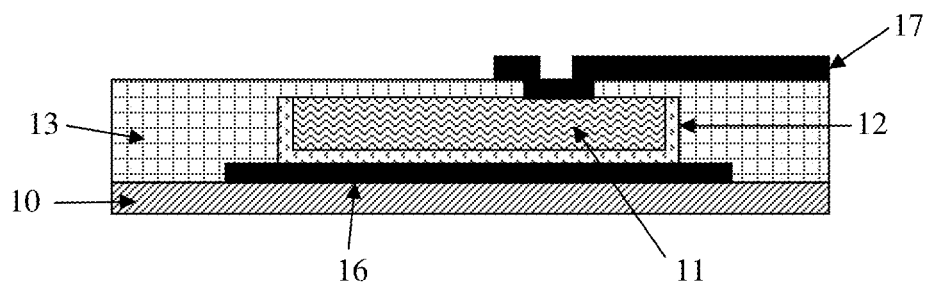

As illustrated in FIG. 3d, a VCSEL 11 is then provided inside the cavity. In the embodiment described here, it is assumed that both electrical contacts of the VCSEL 11 are present at the top surface of the VCSEL. The VCSEL can be thinned from the rear side before positioning it into the cavity, for example to a thickness in the range between about 10 micrometer and 100 micrometer, in the range between about 10 micrometer and 60 micrometer, or in the range between about 10 micrometer and 25 micrometer. The VCSEL 11 is attached to the metal layer 16 and to the encapsulation layer 13 (with its rear side oriented towards the substrate 10), for example by means of a glue layer 12 (such as a flip chip underfill material) that is thermally conductive and that can be hardened at low temperatures (e.g., at temperatures in the range between about 15° C. and 150° C.). The thickness of the glue layer 12 can for example be in the range between about 1 micrometer and 20 micrometer, and particularly in the order of about 10 micrometer.

Next (FIG. 3e) a thin layer of preferably the same encapsulation material (e.g. Su-8) is provided e.g. by spin coating. The thickness of this thin layer can for example be in the range between about 1 micrometer and 50 micrometer, particularly in the range between about 1 micrometer and 20 micrometer, particularly in the range between about 5 micrometer and 15 micrometer. Providing this thin layer increases the thickness of the encapsulation layer or embedding layer 13 and leads to full embedding of the VCSEL 11. Providing this thin layer is preferred because it allows forming good metal patterns on top of it in a later stage of the fabrication process.

In the next step (FIG. 3f) micro-vias are formed in the encapsulation layer 13 towards the electrical contact pads (not shown) of the VCSEL 11, for example by means of laser ablation or by means of photolithography. A metal pattern 17, for example a Cu pattern with a thickness below about 1 micrometer, particularly with a thickness in the range between about 10 nanometer and 1 micrometer, is then provided for forming an electrical contact with the bond pads of the VCSEL. This metal pattern 17 can for example be formed by sputtering and lithographic patterning.

Figure 3G:
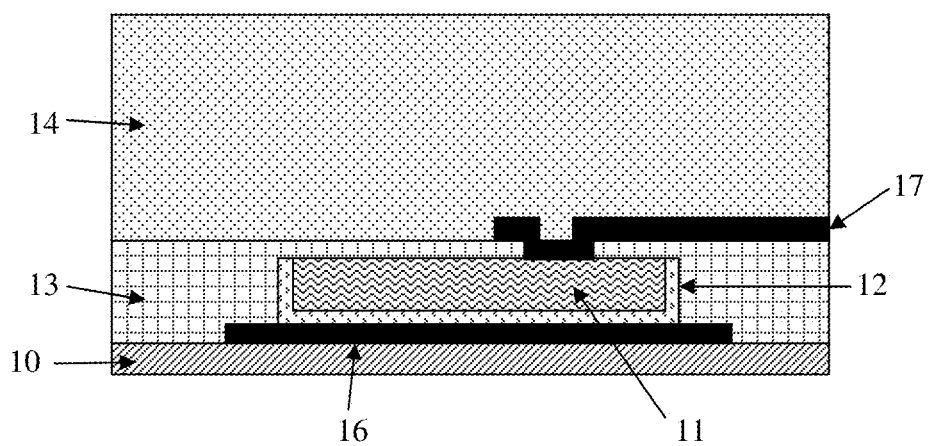

After that, a sensor layer 14 is formed, e.g. by spinning a compressible material, such as e.g. Sylgard 184, PU, PI, SU-8, PMMA, with an appropriate thickness, e.g., with a thickness in the range between about 1 micrometer and 1 mm, particularly in the range between about 10 micrometer and 500 micrometer, particularly in the range between about 50 micrometer and 200 micrometer. This is illustrated in FIG. 3g. Sylgard 184 (Dow Corning) is a two-component silicone elastomer. It can be provided on the substrate by spin coating and it can be thermally hardened in a furnace (e.g., about 1 hour at 200° C. in atmospheric conditions).

Figure 3H:
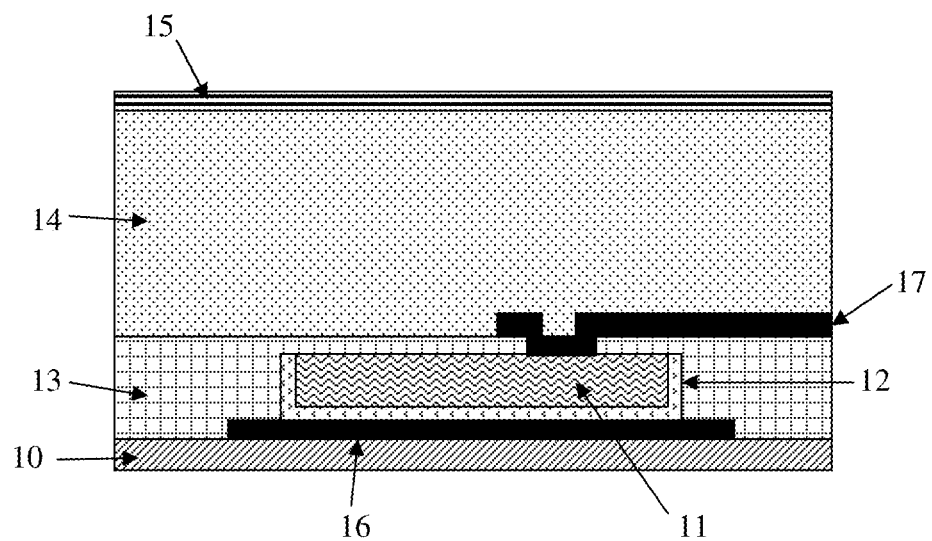

Next, as illustrated in FIG. 3h, an external reflector 15 is provided on the top surface of the sensor layer 14, e.g. by vapor deposition of a metal such as e.g. Au, Al, Cu or Cr with a thickness in the range between about 10 nm and 20 micrometer, particularly in the range between about 10 nm and 10 micrometer, particularly in the range between about 10 nm and 1 micrometer, particularly in the range between about 10 nm and 100 nm. In another embodiment a reflector 15 can be provided by bonding a flex sheet coated with a metal layer, e.g. Cu layer, to the top surface of the sensor layer, with the side of the flex sheet comprising the metal layer facing the sensor layer.

Finally (not illustrated), e.g. for testing purposes, vias can be formed through the sensor layer 14 towards the VCSEL metal contacts 17, for example by means of laser ablation. For example, a combination of $CO_2$ laser ablation (for forming the vias) and Excimer laser ablation (for removing a final thin layer that is left on the metal 17 after $CO_2$ laser ablation) can be used. However, in practical devices this process step may not be needed and instead all electronics may be integrated with the substrate 10.

In one aspect, certain embodiments relate to a method for manufacturing an optical sensor, e.g. an optical sensor as described in the first aspect. The method comprises providing at least one VCSEL on a substrate, providing a compressible sensor layer covering the VCSEL on the substrate and providing a reflecting element covering the compressible sensor layer. Different features and advantages of certain embodiments may be in part or completely as set out in FIG. 3a to FIG. 3h, FIG. 3a to FIG. 3h providing a more detailed description of different steps that may be part of the method according to the present aspect.

In still another aspect, certain embodiments relate to a method for sensing pressure. The method comprises driving a VCSEL for generating a laser beam, guiding the laser beam through a compressible sensor layer, reflecting the laser beam thus redirecting the laser beam to the VCSEL and deriving a pressure on the compressible sensor layer based on a self-mixing interference effect in the VCSEL. The method may be advantageously performed using a sensor as described in the first aspect. Further features and advantages may correspond with the operational features discussed for the sensor as described in the first aspect. Certain embodiments also relate to the use of a sensor as described in the first aspect for measuring a pressure and/or for detecting a tactile event.

Figure 4:
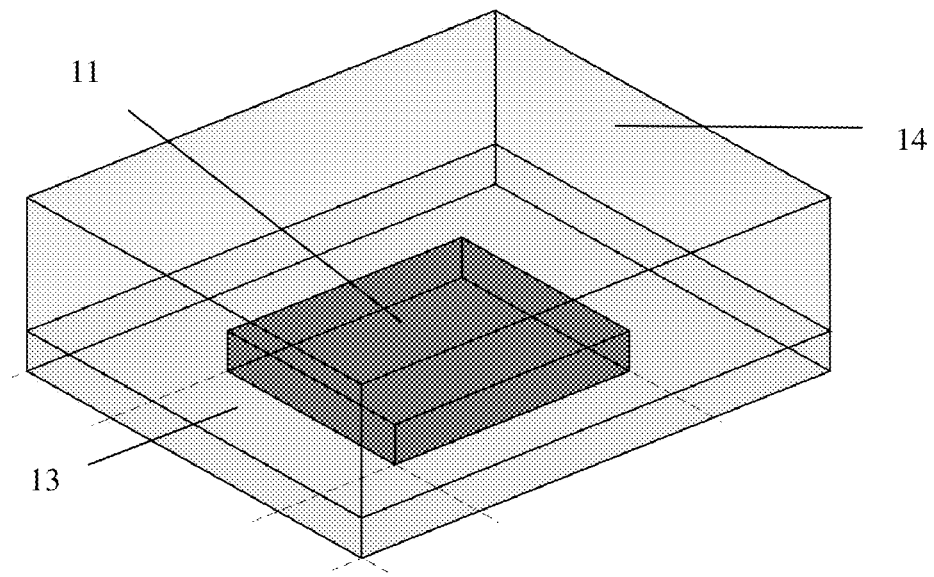
FIG. 4 illustrates the simulation model used for mechanical simulations of a pressure sensor according to one embodiment.

Mechanical simulations were performed for an optical pressure sensor according to one embodiment. The simulation model used is schematically illustrated in FIG. 4. A volume of 500 micrometer×500 micrometer with different thicknesses was simulated, the volume comprising an integrated GaAs VCSEL 11 with a size of 250 micrometer×250 micrometer×30 micrometer. It is assumed that the VCSEL 11 is surrounded by encapsulation material 13 of the same thickness as the VCSEL (i.e. 30 micrometer), the encapsulation material 13 extending at all lateral sides of the VCSEL over a distance of 125 micrometer. It is assumed that on top of this a layer of sensor material 14 with thickness D is present. In the simulations it was assumed that the encapsulation material 13 and the sensor material 14 are the same material.

Simulations were performed with Comsol and Comsol Script. Calculations were performed to determine the displacement $\Delta z$ of the upper surface of the layer of sensor material in a direction orthogonal to that surface, resulting from an applied distributed pressure $P_z$ on that surface. The displacement $\Delta z$ was calculated for different materials of the sensor layer, for different sensor layer thicknesses (corresponding to different values of $L_{ext}$) and for different pressures $P_z$.

In a first set of simulations, different materials for the sensor layer were used: PMMA (poly methyl metacrilate) 502, polyimide 504, Su-8 epoxy photoresist (micro chem) 506, Sylgard 184 silicone elastomer (Dow Corning) 508 and SE 1740 silicone rubber (Dow Corning) 510. Two different models were used for modeling the material properties of the different sensor layer materials. The first model is the Neo-Hookean model for isotropic materials. The characterizing parameters used in this model are the Young's modulus E [Pa] (a measure of the stiffness of an isotropic elastic material), the Poisson's ratio $\nu$ and the material density $\rho$ [kg/m$^3$]. The second model is the Mooney-Rivlin model for hyperelastic materials (such as rubbers and silicones). This model uses two model parameters $C_{01}$ [Pa] and $C_{10}$ [Pa], the Bulk modulus K [Pa] (a measure for a material's resistance to uniform compression, defined as the pressure increase needed to cause a given relative decrease in volume) and the material density $\rho$ [kg/m$^3$]. The model parameters $C_{01}$ and $C_{10}$ are related to the shear modulus G by the following expression: $G=2(C_{01}+C_{10})$. The material parameters used for modeling are shown in Table 1 (Neo-Hookean model) and Table 2 (Mooney-Rivlin model).

TABLE 1

| Parameter | PMMA | Polyimide | SU-8 |
|---|---|---|---|
| Young's modulus E [Pa] | $3.00 \times 10^9$ | $3.10 \times 10^9$ | $4.02 \times 10^9$ |
| Poisson's ratio $\nu$ [—] | 0.40 | 0.34 | 0.22 |
| Density $\rho$ [kg/m$^3$] | 1190 | 1300 | 1190 |

TABLE 2

| Parameter | Sylgard 184 (cast) | SE 1740 |
|---|---|---|
| Model parameter $C_{01}$ [Pa] | 0 | 0 |
| Model parameter $C_{10}$ [Pa] | $2.21 \times 10^5$ | $6.03 \times 10^3$ |
| Bulk modulus K [Pa] | $8.00 \times 10^5$ | $1.00 \times 10^9$ |
| Density $\rho$ [kg/m$^3$] | 1050 | 1006 |

Sylgard 184 and SE 1740 are liquid materials. Layers of these materials can be formed by mixing two components and thermal hardening. All materials are sufficiently transparent at the VCSEL wavelength (e.g., about 850 nm). Other materials that may be used for the sensor layer are for example optical materials such as Ormocore-Ormoclad and Epocore-Epoclad (Micro Resist Technology) and Truemode (Exxelis) or polyurethane, polycarbonate, PEN or PET. For this first set of simulations a thickness of 100 micrometer was assumed for the sensor layer. The distributed pressure $P_z$ was assumed to be 1 bar ($10^5$ Pa). The displacement $\Delta z$ of the top surface of the structure (i.e., the upper surface of the sensor layer) was calculated.

Figure 5:
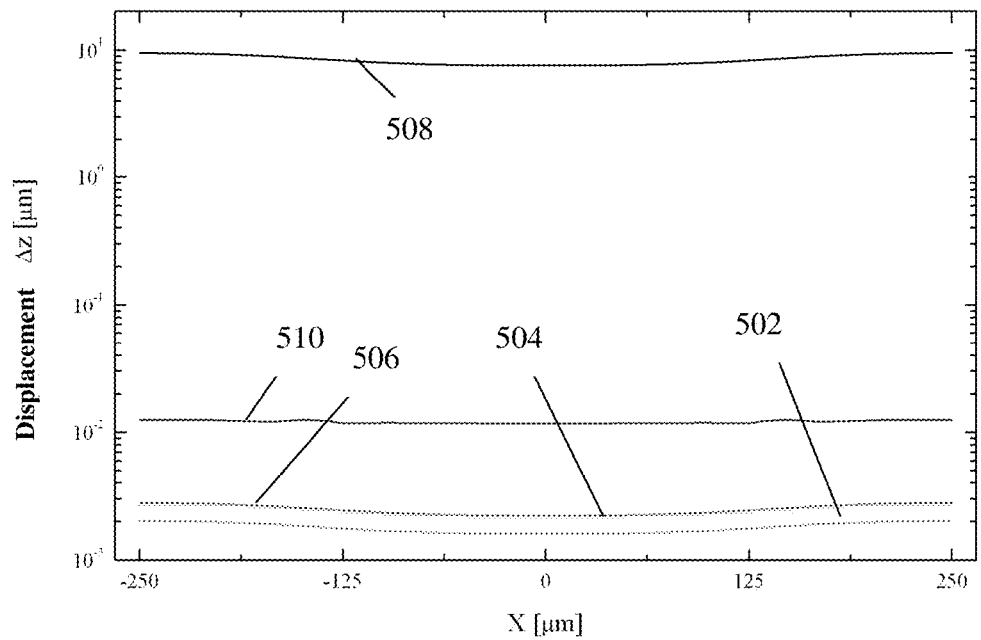
FIG. 5 shows the calculated displacement Δz of the top surface of the sensor layer as a function of the location along the x-axis for different sensor layer materials with a thickness of 100 micrometer and for a distributed pressure of 1 bar on the top surface of the sensor layer.

For the case wherein the sensor layer is a 100 micrometer thick Sylgard 184 layer, a maximum displacement $\Delta z$ of about 9.65 micrometer was calculated. This maximum displacement is reached at the edges of the simulated structure and not in the center. This is related to the presence of the rigid VCSEL (encapsulated in the sensor layer) in the center part of the simulated structure. Therefore the displacement $\Delta z$ in the region where the VCSEL is present is smaller than in the surrounding regions. FIG. 5 shows the calculated displacement $\Delta z$ of the top surface of the sensor layer as a function of the location along the x-as direction (being a direction parallel to the surface of the substrate and parallel to an edge of the VCSEL). These results illustrate the difference in displacement $\Delta z$ between the edges of the simulated structure and the center of the simulated structure. FIG. 5 also clearly shows a difference in displacement $\Delta z$ for the different sensor layer materials. These differences are related to the difference in mechanical parameters (as shown in Table 1 and Table 2). The average displacement of the external surface above the VCSEL amounts to about 7.98 micrometer for Sylgard 184, about 11.9 nm for SE 1740, 2.34 nm for SU-8, about 2.26 nm for polyimide and 1.69 nm for PMMA. The largest displacement is clearly obtained with the Sylgard 184 material. It is the only material from the group of materials that was simulated that reaches the detection limit $\lambda/2$ (425 nm) for a pressure of about 1 bar.

Figure 6:
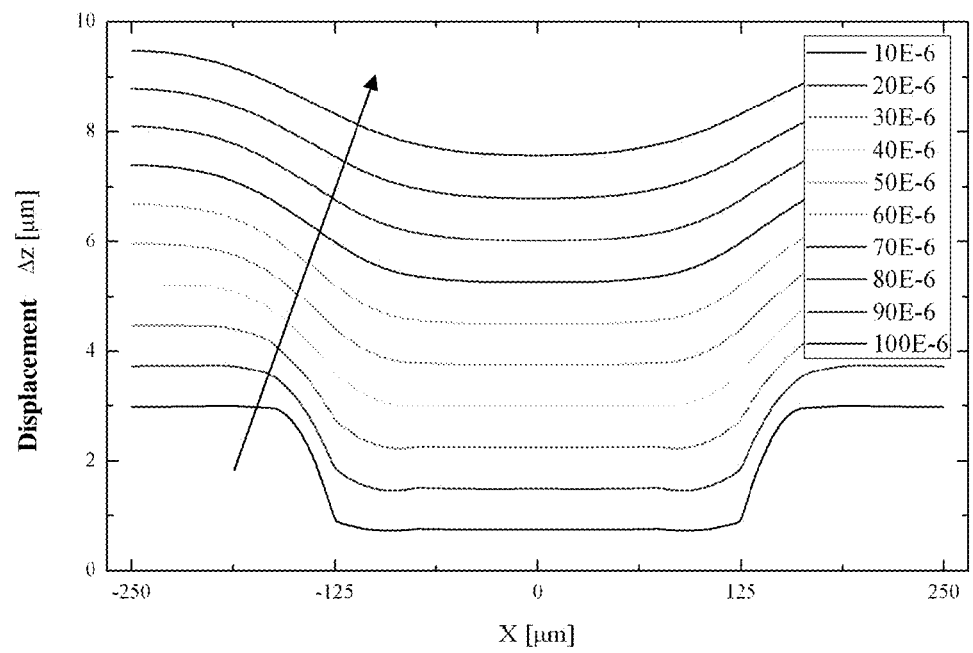
FIG. 6 shows the calculated displacement Δz of the top surface of a Sylgard 184 sensor layer as a function of the location along the x-axis for different thicknesses of the sensor layer and for a distributed pressure of 1 bar on the top surface of the sensor layer.
Figure 7:
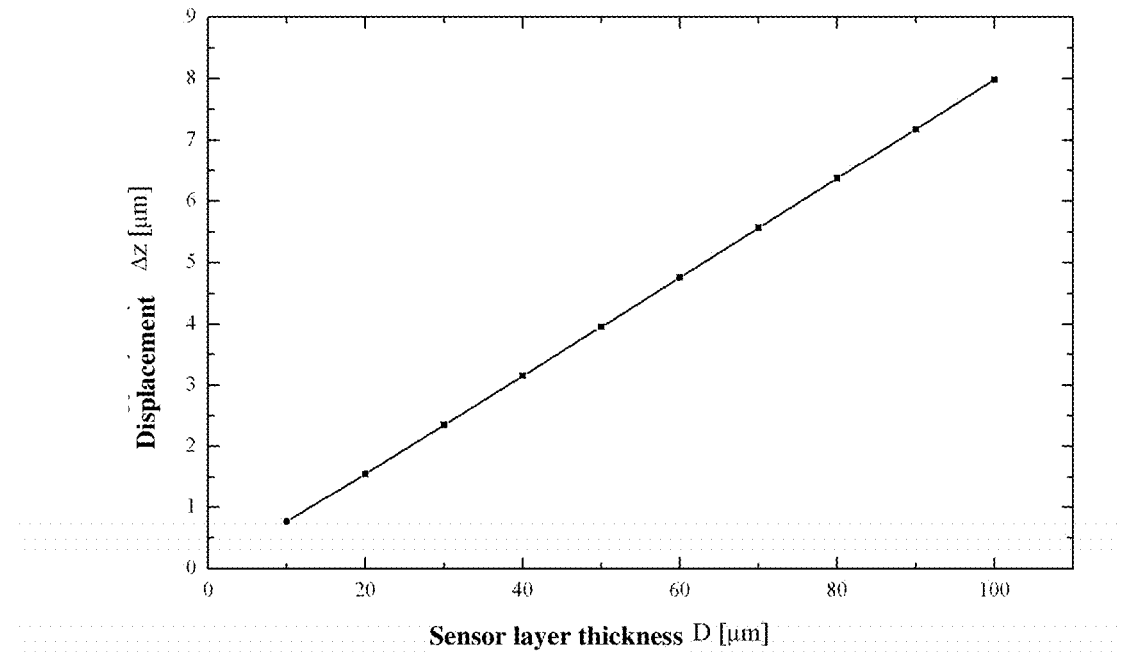
FIG. 7 shows the average displacement Δz of the top surface of a Sylgard 184 sensor layer in an area above an embedded VCSEL as a function of the thickness of the sensor layer for a distributed pressure of 1 bar on the top surface of the sensor layer.

A second set of simulations was performed wherein it was assumed that the sensor layer comprises the Sylgard 184 material. Calculations were performed for different thicknesses of the sensor layer, ranging from 10 micrometer to 100 micrometer—the thicknesses being increasing from 10 micrometer to 100 micrometer in steps of 10 micrometer in the direction of the arrow, for a distributed pressure $P_z$ of 1 bar on the top surface. The results are shown in FIG. 6 indicating the displacement as function of the location along the x-axis. As can be expected, the vertical displacement $\Delta z$ of the top surface increases with increasing thickness of the sensor layer. FIG. 7 shows the average displacement above the VCSEL as a function of the sensor layer thickness. A linear relationship can be observed. For a sensor layer thickness of 10 micrometer the displacement $\Delta z$ of its top surface amounts to about 800 nm; for a sensor layer thickness of 100 micrometer the displacement amounts to about 8 micrometer. From these simulations it can be concluded that, for the configuration modeled here, with a Sylgard 184 sensor layer the compression of the sensor layer equals about 8% of the layer thickness for a distributed pressure $P_z$ of 1 bar.

Figure 8:
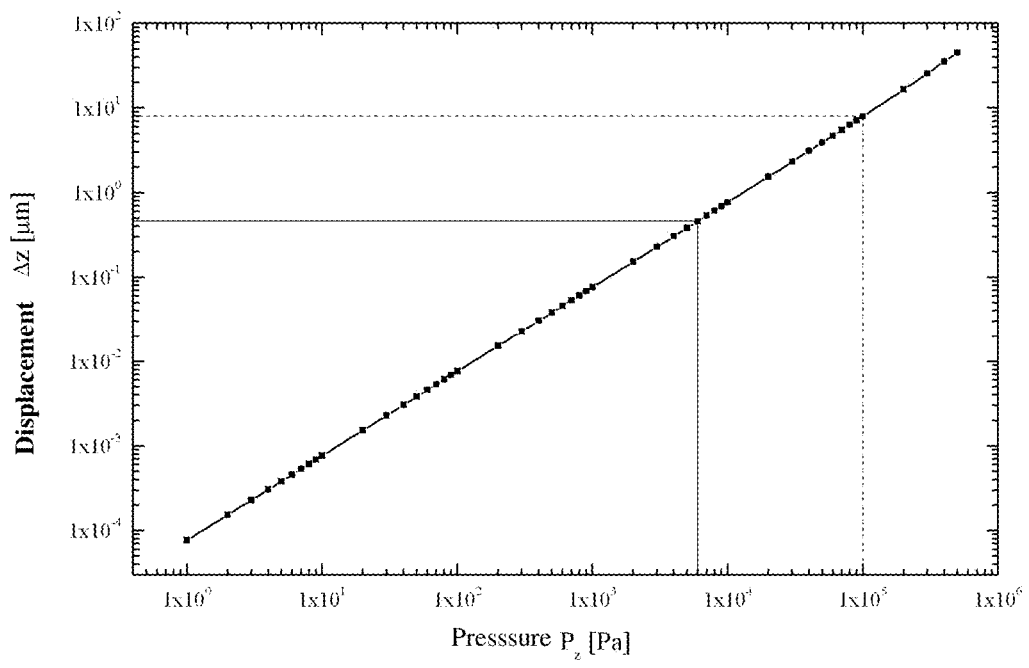
FIG. 8 shows the average displacement Δz of the top surface of a 100 micrometer thick Sylgard 184 sensor layer in an area above an embedded VCSEL as a function of the distributed pressure on the top surface of the sensor layer.

A third set of simulations was performed for different values of the distributed pressure $P_z$ for a structure with a 100 micrometer thick Sylgard 184 sensor layer. The pressure $P_z$ was varied in the range between 1 Pa and $5 \times 10^5$ Pa. FIG. 8 shows the simulated average displacement of the top surface of the sensor layer above the VCSEL, as a function of the distributed pressure $P_z$. The displacement increases from about 80 pm at a pressure of 1 Pa to more than about 45 micrometer at a pressure of 5 bar ($5 \times 10^5$ Pa). The relationship is substantially linear. At pressures below $10^4$ Pa the compression coefficient of the 100 micrometer thick Sylgard 184 sensor layer is about 80 pm/Pa. For pressures above $10^4$ Pa this coefficient increases, to about 100 pm/Pa at a pressure of $5 \times 10^5$ Pa. These values are obtained based on the material parameters shown in Table 1 and Table 2.

The functional pressure range for such a pressure sensor with a 100 micrometer thick Sylgard 184 sensor layer can be estimated, based on the requirement of having at least one interferometric period in the VCSEL signal, occurring at a displacement of 425 nm. Based on this, the lower detection limit for the structure corresponding to the simulations of FIG. 8 is about $6 \times 10^3$ Pa (indicated with solid lines in FIG. 8). In a more preferred situation, the lower detection limit may be associated with two interferometric periods. For the simulations shown in FIG. 8 this would correspond to a pressure of about $1.2 \times 10^4$ Pa. An upper detection limit for this sensor may be $10^5$ Pa, because for higher pressures the compression coefficient is strongly increasing, which may give rise to inelastic behavior of the sensor layer. At this upper limit the displacement of the upper surface of the sensor layer is about 8 micrometer, corresponding to about 20 interferometric periods and thus the resolution is about $5 \times 10^3$ Pa.

Measurements were performed for an optical pressure sensor according to one embodiment wherein the sensor was made on a rigid FR4 substrate 10 with a Cu island 16. As an active component a multimode VCSEL chip of ULM Photonics with a wavelength $\lambda$ of 850 nm and with both contacts at the top surface was used. The VCSEL was thinned down to 60 micrometer before embedding it in the SU-8 encapsulation material. The thickness of the glue layer 12 was 10 micrometer and the thickness of the Cu metallization 17 was 1 micrometer. For the experiments the reflector 15 was not formed directly on the top surface of the sensor layer 14. Instead, a separate glass substrate with an Au layer was provided at the top surface of the sensor layer, with the Au minor layer oriented towards the sensor layer.

Figure 9:
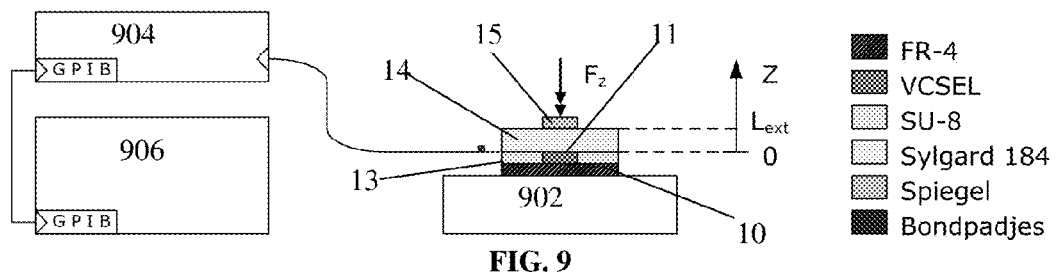
FIG. 9 schematically shows a measurement set-up used for characterizing an optical sensor according to one embodiment.

FIG. 9 shows the measurement set-up that was used. The pressure sensor is provided on a rigid carrier 902. The VCSEL 11 is supported on a substrate 10 made of FR-4. The VCSEL 11 is embedded in encapsulation material 13 of type SU-8 and covered with a sensing layer 14 made of Sylgard 184. At the top a reflective element, in the present example being a minor 15 is present. The VCSEL 11 is driven and read out by a source measure unit 904 SMU connected to a computer 906 by means of a GPIB interface. A sampling period of 85 ms was used, corresponding to a sampling frequency of 11.772 Hz. A pressure was applied on the top surface of the sensor layer by providing a weight on the top surface. Different distributed pressures were obtained by using different weights: 30.5 g, 90.1 g, 110.5 g and 161.9 g.

Figure 10:
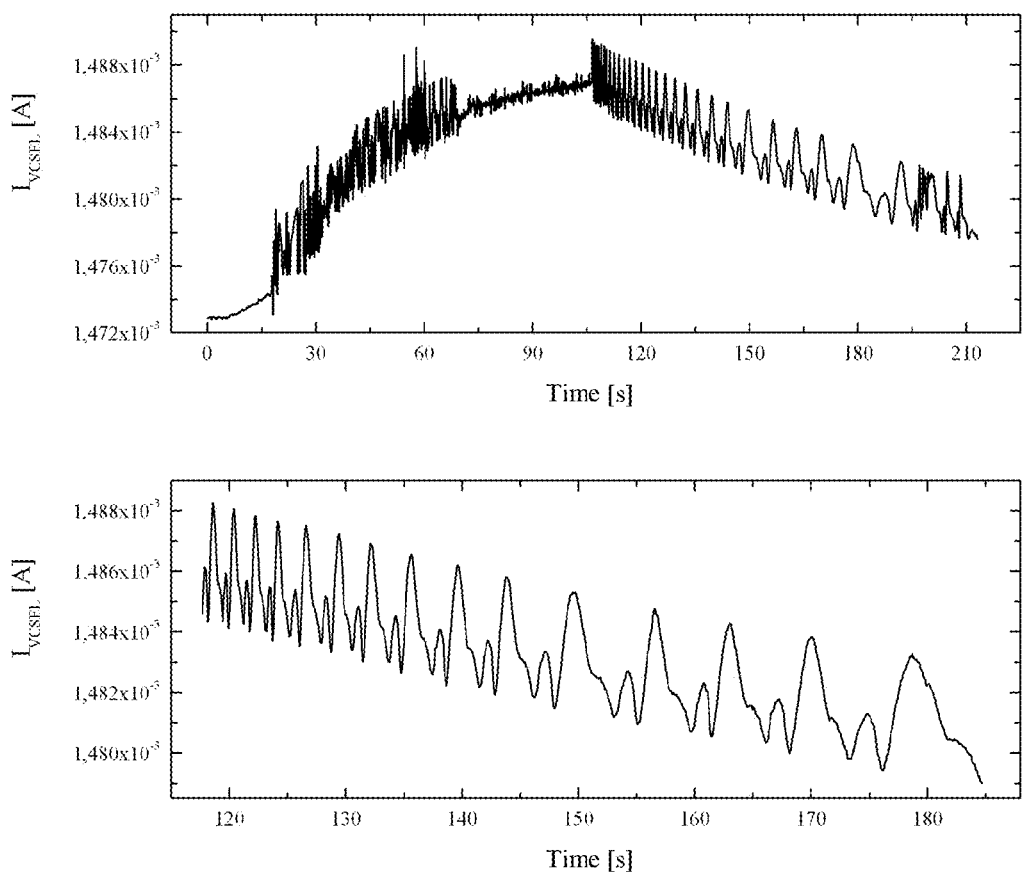
FIG. 10 shows the measured current through a VCSEL of a pressure sensor according to one embodiment wherein a pressure step of about 73530 Pa is applied to the top surface of the pressure sensor.

Measurements were performed with a VCSEL driving voltage of 1.8 V. The maximum pressure reached is about 73530 Pa. The measurement result, i.e. the measured current through the VCSEL as a function of time is shown in FIG. 10. FIG. 10(a) shows the evolution of the current through the VCSEL over the full period of the experiment. At 0 s there is no weight on the sensor. At about 10 s the weight is manually positioned on the sensor and after 2 minutes it is removed again. In the first phase, when putting the weight on the sensor, the signal shows a noisy behavior and no interferometric signal can be detected. This can be related to the relatively low sampling frequency used in the experiments. In the second phase, after removing the weight, an interferometric signal is clearly detected (see also FIG. 10(b)). A double periodicity is seen, which is related to the multimode character of the VCSEL. About 30 double periods are present in the signal, corresponding to a displacement of the sensor top surface of about 12.75 micrometer. The non-constant frequency of the signal is related to the capacitive effect or memory effect of the Sylgard 184 sensor layer.

Both single mode and multimode VCSEL devices can be used in pressure sensors and tactile sensors according to one embodiment. The use of a multimode VCSEL instead of a monomode VSCEL can have the advantage of double resolution. In view of an easy fabrication process, it is preferred that both contacts of the VCSEL are located at one side, preferably the top side of the VCSEL. In case a first contact is present at the bottom side of the VCSEL and a second contact is present at the top side of the VCSEL, fabrication of an optical sensor becomes more complex. In such a case an electrically conductive glue can be used for realizing a bottom contact. It may be difficult to thin such a component. In case no thinning of the VCSEL is done, a thicker encapsulation layer is needed, leading to a reduced flexibility of the sensor.

In one embodiment the encapsulation layer 13 and the sensor layer 14 can be made of a same material. Alternatively, they can be made of a different material. Using two different materials, e.g. a relatively hard encapsulation layer material and a more compressible sensor layer material may lead to a reduction in variations in the displacement $\Delta z$ of the top surface of the sensor layer as a function of the location along the x-axis (as e.g. shown in the simulations of FIG. 6).

An optical sensor according to one embodiment can be a flexible sensor. In this case for example a glass substrate can be used as a rigid carrier during fabrication, the glass substrate being treated at the edges with an adhesion promoter such that the device is well attached to the temporary glass substrate during the production process (at the edges, not in the center). After fabrication, the sensor can be cut, for example by means of laser ablation, from the substrate. Afterwards a polyimide layer can be provided for improving the flexibility and reliability of the sensor. A sensor according to one embodiment can be a stretchable sensor. Such a stretchable sensor can be realized by providing the VCSEL on a stretchable substrate, by patterning the metal (e.g. Cu) layers with meandering tracks, and by using a stretchable sensor layer.

A two-dimensional array of individual pressure sensors according to one embodiment can be used for tactile sensing. The fabrication of such a tactile sensor can be substantially the same as the process shown in FIG. 3, wherein either chips with multiple VCSELs or multiple separate VCSEL chips can be used. The extension to a two-dimensional array (optical tactile sensor) does not incorporate any loss in sensitivity of the individual sensor elements. Such optical tactile sensors may for example be used to allow interaction of robots with humans or allow operation of robots in non-structured environments. For example, in robotic surgery an optical tactile sensor according to one embodiment may be attached to the robot's fingers and may provide valuable tactile information to the operator.

Figure 11:
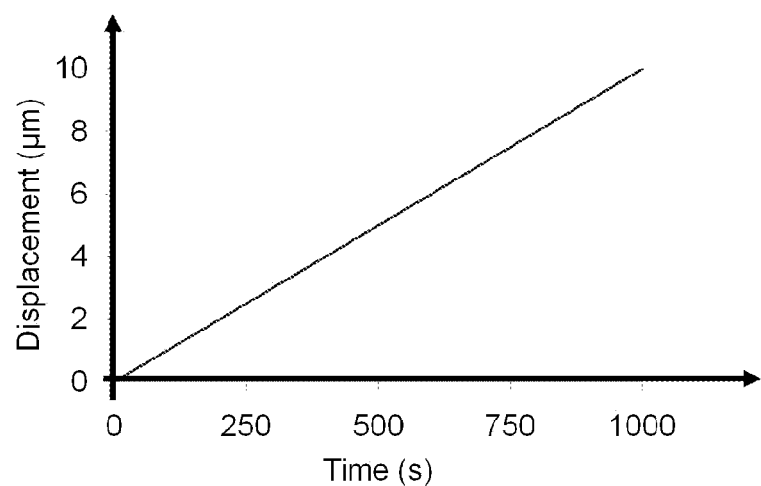
FIG. 11 shows a linear displacement as function of time as was applied in an experiment indicating features and advantages of an optical sensor according to one embodiment.
Figure 12:
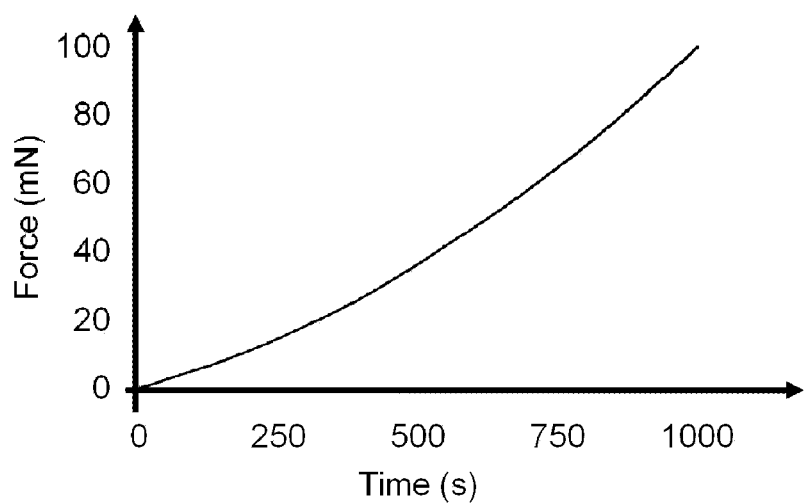
FIG. 12 shows a force as function of time corresponding with the displacement induced in an optical sensor as shown in FIG. 11.
Figure 13:
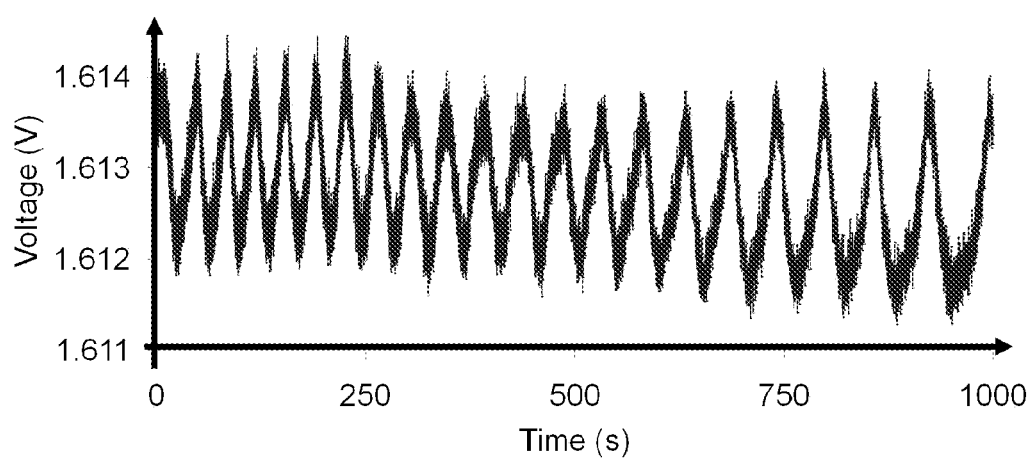
FIG. 13 shows the electrical response of the VCSEL to the displacement induced in an optical sensor as shown in FIG. 11.

By way of illustration, embodiments not being limited thereby, experimental results are discussed, illustrating features and advantages of certain embodiments. In the experimental results shown, a nano-indenter is used for characterizing the VCSEL-based sensor. The schematic setup is similar as the one shown in FIG. 9. The nano-indenter setup enabled the application of small displacements (down to a few nm) or forces, the applied displacements or forces being simultaneously readout with the resulting forces or displacements respectively. A data acquisition channel was used for sampling the electrical voltage of the VCSEL sensor at 64 Hz. The different data were linked to the same time reference. The nanoindenter was able to perform quasi-dynamic measurements on the sensor and the accurate definition of force and displacement allowed a low-noise reconstruction of the electrical interference VCSEL signal. The results of the measurements are shown in FIGS. 11, 12 and 13, indicating respectively the displacement as function of time, the applied force as function of time and the corresponding voltage signal of the VCSEL as function of time. A displacement was linearly applied up to 10 μm. The resulting force was measured by the nano indenter and increased up to 100 mN. The non-linearity in the force could be linked to the mechanical response of the sensor layer material. The VCSEL was driven at 2 mA and the resulting voltage was 1.613 V. Periodic variations in the mV range were observed, without any further signal conditioning.

The period of the interferometric signal is equal to half the VCSEL wavelength (425 nm in the experiment). In FIG. 13, 22 periods could be counted, corresponding to a measured displacement of 9.35 μm, which is in relative good agreement with the applied displacement of 10 μm.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

What is claimed is:

1. A sensor for sensing pressure, the sensor comprising:
   at least one vertical-cavity surface-emitting laser (VCSEL) on a substrate, the VCSEL being configured to emit light;
   a compressible sensor layer covering a top surface of the at least one VCSEL, the compressible sensor layer being configured to transmit light emitted from the VCSEL; and
   a reflecting element covering a top surface of the sensor layer and configured to reflect at least a portion of the light transmitted through the compressible sensor layer after being emitted from the VCSEL.

2. The sensor according to claim 1, further comprising a processing unit configured to derive a pressure based on a self-mixing interference effect caused by reflection of radiation of the VCSEL at the reflecting element and on the mechanical characteristics of the compressible sensor layer.

3. The sensor according to claim 2, wherein the processing unit is configured to derive an electrical parameter of the at least one VCSEL responsive to the self-mixing interference.

4. The sensor according to claim 1, wherein the VCSEL is embedded in the compressible sensor layer or in a solid and/or liquid encapsulation material in direct contact with the compressible sensor layer.

5. The sensor according to claim 1, the sensor comprising a plurality of VCSELS.

6. The sensor according to claim 5, further comprising a processing unit configured to derive data of a tactile event based on multiple pressure sensing in the plurality of VCSELS.

7. The sensor according to claim 5, wherein the plurality of VCSELS are integrated on a single chip substrate.

8. The sensor according to claim 7, wherein a pitch for the plurality of VCSELS is smaller than about 250 μm.

9. The sensor according to claim 1, wherein the sensor comprises a flexible substrate configured to support the at least one VCSEL.

10. The sensor according to claim 1, wherein the sensor is configured to drive the at least one VCSEL at a fixed voltage higher than the laser threshold voltage, further comprising a processing unit configured to measure the current of the at least one VCSEL.

11. The sensor according to claim 1, wherein the VCSEL is configured to emit light of a first wavelength, and wherein the compressible sensor layer is optically transparent at the first wavelength.

12. The sensor according to claim 1, wherein the compressible sensor layer is in direct contact with the VCSEL.

13. The sensor according to claim 1, wherein the reflecting element is in direct contact with the compressible sensor layer.

14. The sensor according to claim 1, wherein the reflecting element covers substantially the entire top surface of the sensor layer.

15. A method for manufacturing a sensor, the method comprising:
   providing at least one vertical-cavity surface-emitting laser (VCSEL) on a substrate, the VCSEL being configured to emit light;
   providing a compressible sensor layer covering the VCSEL on the substrate, the compressible sensor layer being configured to transmit light emitted from the VCSEL; and
   providing a reflecting element covering the compressible sensor layer and configured to reflect at least a portion of the light transmitted through the compressible sensor layer after being emitted from the VCSEL.

16. The method according to claim 15, wherein providing a compressible sensor layer covering the VCSEL on the substrate comprises depositing the compressible sensor layer on top of the VCSEL or a layer embedding the VCSEL.

17. The method according to claim 15, wherein providing at least one VCSEL on a substrate comprises:
   providing an encapsulation layer on the substrate;
   creating a cavity in the encapsulation layer suitable for accommodating the VCSEL; and embedding the VCSEL and further encapsulating the VCSEL by providing a further encapsulation layer.

18. The method according to claim 15, wherein providing at least one VCSEL on a substrate comprises providing a plurality of VCSELS.

19. The method according to claim 18, wherein a pitch between the plurality of VCSELS is smaller than about 250 μm.

20. The method according to claim 15, further comprising providing a processing unit configured to derive a pressure based on a self-mixing interference effect caused by reflection of radiation of the VCSEL at the reflecting element and on the mechanical characteristics of the compressible sensor layer.

21. The method according to claim 20, wherein the processing unit is configured to derive an electrical parameter of the at least one VCSEL responsive to the self-mixing interference.

22. The method according to claim 15, wherein the substrate is flexible.

23. A method of sensing pressure, the method comprising:
driving a vertical-cavity surface-emitting laser (VCSEL) for generating a laser beam;
guiding the laser beam from the VCSEL through a compressible sensor layer covering a top surface of the VCSEL, the compressive sensor layer being configured to transmit the laser beam emitted from the VCSEL;
reflecting the laser beam transmitted through the compressible sensor layer thus redirecting the laser beam to the VCSEL; and
deriving a pressure on the compressible sensor layer based on a self-mixing interference effect in the VCSEL.

24. The method according to claim 23, wherein deriving a pressure is based on determination of an electrical characteristic of the VCSEL responsive to the self-mixing interference effect.

* * * * *